United States Patent
Briff et al.

(10) Patent No.: US 11,871,166 B2
(45) Date of Patent: Jan. 9, 2024

(54) SENSOR SYSTEM

(71) Applicant: GENERAL ELECTRIC TECHNOLOGY GMBH, Baden (CH)

(72) Inventors: Pablo Briff, Stafford (GB); Leandro Gaston Vacirca, Stafford (GB); Kimmo Kalevi Hamynen, Stafford (GB)

(73) Assignee: General Electric Technology GMBH, Baden (CH)

( * ) Notice: Subject to any disclaimer, the term of this patent is extended or adjusted under 35 U.S.C. 154(b) by 392 days.

(21) Appl. No.: 16/327,532

(22) PCT Filed: Aug. 8, 2017

(86) PCT No.: PCT/EP2017/070118
§ 371 (c)(1),
(2) Date: Feb. 22, 2019

(87) PCT Pub. No.: WO2018/036815
PCT Pub. Date: Mar. 1, 2018

(65) Prior Publication Data
US 2019/0191231 A1  Jun. 20, 2019

(30) Foreign Application Priority Data
Aug. 23, 2016 (EP) .................... 16185254

(51) Int. Cl.
*H04Q 9/00* (2006.01)
*G08C 25/00* (2006.01)

(52) U.S. Cl.
CPC ............. *H04Q 9/00* (2013.01); *G08C 25/00* (2013.01); *G08C 2200/00* (2013.01); *H04Q 2209/84* (2013.01)

(58) Field of Classification Search
CPC ...... H04Q 9/00; H04Q 2209/84; G08C 25/00; G08C 2200/00
See application file for complete search history.

(56) References Cited

U.S. PATENT DOCUMENTS

| | | | |
|---|---|---|---|
| 5,479,421 A | 12/1995 | Takebe | |
| 2009/0067324 A1* | 3/2009 | Licardie | H04L 45/22 370/225 |

(Continued)

OTHER PUBLICATIONS

European Search Report and Written Opinion dated Feb. 10, 2017 which was issued in connection with EP 16185254.6 which was filed on Aug. 23, 2016.

(Continued)

*Primary Examiner* — Amine Benlagsir
(74) *Attorney, Agent, or Firm* — Eversheds Sutherland (US) LLP (57) ABSTRACT

There is provided a sensor system for use in a high voltage direct current network. The sensor system comprises a plurality of sensor devices, each sensor device configured to obtain a respective sensor measurement, wherein the plurality of sensor devices are configured to generate a serial data unit for transmission to a recipient system, the serial data unit configured to include the plurality of sensor measurements ($S_1$, $S_2$, $S_n$), the serial data unit further configured to include a plurality of validity indicators ($FCS_1$, $FCS_2$, $FCS_n$), each validity indicator ($FCS_1$, $FCS_2$, $FCS_n$) configured to provide an individual validity status of a respective one of the plurality of sensor measurements ($S_1$, $S_2$, $S_n$).

20 Claims, 4 Drawing Sheets (56) References Cited

U.S. PATENT DOCUMENTS

| | | | | |
|---|---|---|---|---|
| 2012/0093312 A1* | 4/2012 | Gammel | ............... | H04L 9/3271 |
| | | | | 380/255 |
| 2015/0121160 A1* | 4/2015 | Baone | .................... | G01D 3/028 |
| | | | | 714/746 |
| 2016/0057510 A1* | 2/2016 | Hammerschmidt | ..... | H04Q 9/00 |
| | | | | 340/870.01 |
| 2017/0238126 A1* | 8/2017 | Zhao | ....................... | H04W 4/80 |
| | | | | 455/41.2 |
| 2019/0116088 A1* | 4/2019 | Mueglitz | .............. | A61B 5/0002 |

OTHER PUBLICATIONS

International Search Report and Written Opinion dated Oct. 13, 2017 which was issued in connection with PCT/ EP2017/070118 which was filed Aug. 8, 2017.

\* cited by examiner

SENSOR SYSTEM

BACKGROUND OF THE DISCLOSURE

This invention relates to a sensor system, for use in a high voltage direct current (HVDC) network, and to a method of operating a sensor system, for use in a HVDC network.

It is known to use sensors in a HVDC network to measure the properties of the HVDC network.

BRIEF SUMMARY

According to a first aspect of the invention, there is provided a sensor system for use in a high voltage direct current network, the sensor system comprising a plurality of sensor devices, each sensor device configured to obtain a respective sensor measurement, wherein the plurality of sensor devices are configured to generate a serial data unit for transmission to a recipient system, the serial data unit configured to include the plurality of sensor measurements, the serial data unit further configured to include a plurality of validity indicators, each validity indicator configured to provide an individual validity status of a respective one of the plurality of sensor measurements.

Each sensor measurement may include a single physical measurement or may include a set of physical measurements arranged serially. For example, a given sensor device may obtain a sensor measurement that includes a single voltage or current, or a sensor measurement that includes a set of several voltages and/or currents arranged serially in a measurement data unit. Namely, each sensor measurement in the serial data unit may correspond to one or more physical measurements.

The serial data unit includes a sequence of bits that occurs on a single data line, and may be in the form of a serial data packet or frame. It will be understood that a "bit" is an electrical or optical signal processed by a software and/or hardware module or circuit.

The use of a serial data unit enables the transmission of a plurality of sensor measurements from the plurality of sensor devices to the recipient system (such as a HVDC network controller) at low latency to ensure stability of control of the HVDC network and its components (such as a converter). However, the integrity of the serial data unit can be adversely affected by at least one faulty bit arising from bit error, which may be introduced by noise levels.

Conventionally a serial data unit includes an error-detecting code, which can be used to detect whether an error is present in the serial data unit. When an error is detected in a serial data unit, the entire serial data unit is discarded, and a new serial data unit has to be transmitted from the plurality of sensor devices to the recipient system. The discarding of the entire original serial data unit may however be unacceptable for HVDC applications. This is because discarding the entire original serial data unit may result in the discarding of useful sensor information, particularly in relation to time-sensitive circumstances such as a fault occurrence.

By providing the plurality of validity indicators in the serial data unit, it becomes possible to discern the individual data quality of each sensor measurement stored in the serial data unit in order to enable the retrieval of useful sensor information from a serial data unit that includes at least one error, which in turn may limit or eliminate the need to transmit a new serial data unit. This has the effect of improving the reliability and performance of the sensor system.

In contrast, the aforementioned conventional method of detecting an error in the serial data unit does not take into account the individual data quality of each sensor measurement, i.e. the aforementioned conventional method of detecting an error in the serial data unit is incapable of determining which of the sensor measurements is invalid.

The invention is not only scalable to any number of sensor devices in the sensor system, but also allows the data error rate (i.e. the number of data errors per unit time) to be controlled independently of the number of sensor devices.

In embodiments of the invention, the sensor system may further include a sensor management unit configured to evaluate each validity indicator to determine whether the corresponding sensor measurement is either valid or invalid.

The provision of the sensor management unit allows the evaluation of the individual data quality of each sensor measurement prior to transmission of the sensor measurements to the recipient system. This in turn permits the implementation of a suitable data forwarding strategy to improve the retrieval of useful sensor information from the serial data unit.

Optionally the sensor system may further include at least one gateway configured to be in communication with the plurality of sensor devices. The or each gateway may include the sensor management unit, and the or each gateway may be configured to be communicable with the recipient system.

The sensor management unit may be configured to transmit the serial data unit to the recipient system in response to the sensor management unit determining that none of the plurality of sensor measurements are invalid.

The sensor management unit may be configured to generate a modified serial data unit based on the serial data unit subsequent to the sensor management unit evaluating each validity indicator, and to transmit the modified serial data unit to the recipient system.

The modified serial data unit may be configured in a number of ways to improve the performance of the sensor system.

The modified serial data unit may be configured to include at least one valid sensor measurement from the serial data unit. Such configuration of the modified serial data unit enables the recipient system to retrieve useful sensor information in the form of the or each valid sensor measurement from the modified serial data unit.

The modified serial data unit may be configured to omit the validity indicators from the serial data unit. Such configuration of the sensor management unit enables the reduction of the size of the modified serial data unit, which improves the efficiency of transmitting the modified serial data unit.

The sensor management unit may be configured to generate the modified serial data unit based on the serial data unit in response to the sensor management unit determining that at least one of the plurality of sensor measurements is invalid. Such configuration of the sensor management unit permits the generation of the modified serial data unit to be responsive to the determination that at least one of the plurality of sensor measurements is invalid, so as to improve the retrieval of useful sensor information from the modified serial data unit.

The modified serial data unit may be configured to include an error indicator that identifies the or each invalid sensor measurement. Such configuration of the modified serial data unit allows the recipient system to easily and accurately identify the or each invalid sensor measurement, thus making it more straightforward to retrieve useful sensor information from the modified serial data unit.

The sensor management unit may be configured to generate the modified serial data unit by replacing the or each invalid sensor measurement with a or a respective replacement sensor measurement. Such configuration of the sensor management unit increases the amount of useful sensor information that can be retrieved from the modified serial data unit.

There are a number of ways of obtaining the or the respective replacement sensor measurement, non-limiting examples of which are described as follows.

The sensor management unit may be configured to obtain the or the respective replacement sensor measurement by performing signal processing of at least one of the plurality of sensor measurements.

The sensor management unit may be configured to obtain the or the respective replacement sensor measurement by estimating the or the respective replacement sensor measurement.

The sensor management unit may be configured to obtain the or the respective replacement sensor measurement by filtering at least one prior sensor measurement obtained at an earlier time. The or each prior sensor measurement may be stored in the corresponding gateway.

The sensor management unit may be configured to obtain the or the respective replacement sensor measurement by predicting the or the respective replacement sensor measurement based on a prediction model and at least one prior sensor measurement obtained at an earlier time.

The sensor management unit may be configured to obtain the or the respective replacement sensor measurement by deriving the or the respective replacement sensor measurement from a redundant sensor measurement obtained by a corresponding redundant sensor device and/or by application level redundancy. This allows the direct replacement of an invalid sensor measurement with an actual sensor measurement obtained from a redundant sensor device.

It will be understood that the term "application level redundancy" in the context of this invention refers to the use of one or more other measurement available in the application (which in this case is the high voltage direct current network) in order to obtain the or each redundant sensor measurement.

For example, if a given sensor measurement is linked to one or more other sensor measurements at application level, a redundant version of the given sensor measurement can be obtained by the application level redundancy via the relationship between the given sensor measurement and the or each other sensor measurement at application level. Namely, although the sensor devices can be independent of each other, it is the application that links the sensor measurements together.

The sensor management unit may be configured to obtain the or the respective replacement sensor measurement by deriving the or the respective replacement sensor measurement from at least one valid sensor measurement. For example, the sensor management unit may be configured to perform a calculation (e.g. extrapolation, interpolation, etc.) of the or the respective replacement sensor measurement based on one or more valid sensor measurements.

The modified serial data unit may be configured to include an error-detecting code, the error-detecting code configured to provide a validity status of the modified serial data unit.

The error-detecting code may be in the form of a validity check sequence number, such as a cyclic redundancy check (CRC) or a frame checksum sequence (FCS). The provision of the error-detecting code in the modified serial data allows the recipient system to evaluate the validity of the modified serial data.

The modified serial data unit may be configured to include at least one error correction code, the or each error correction code associated with a or a respective invalid sensor measurement, the or each error correction code being configured to be usable to correct an error in the corresponding invalid sensor measurement and/or an error in at least one of the plurality of validity indicators. The provision of the or each error correction code in the modified serial data allows the recipient system to correct the or each invalid sensor measurement and/or at least one of the plurality of validity indicators.

According to a second aspect of the invention, there is provided a method of operating a sensor system, wherein the sensor system is for use in a high voltage direct current network, the sensor system comprising a plurality of sensor devices, each sensor device configured to obtain a respective sensor measurement, the method further including the step of generating a serial data unit for transmission to a recipient system, the serial data unit configured to include the plurality of sensor measurements, the serial data unit further configured to include a plurality of validity indicators, each validity indicator configured to provide an individual validity status of a respective one of the plurality of sensor measurements.

The features and advantages of the sensor system of the first aspect of the invention and its embodiments apply mutatis mutandis to the method of the second aspect of the invention and its embodiments.

The method of the invention may include the step of evaluating each validity indicator to determine whether the corresponding sensor measurement is either valid or invalid.

The method of the invention may include the step of transmitting the serial data unit to the recipient system in response to the determination that none of the plurality of sensor measurements are invalid.

The method of the invention may include the steps of: generating a modified serial data unit based on the serial data unit subsequent to the evaluation of each validity indicator; and transmitting the modified serial data unit to the recipient system.

In the method of the invention, the modified serial data unit may be configured to include at least one valid sensor measurement from the serial data unit.

In the method of the invention, the modified serial data unit may be configured to omit the validity indicators from the serial data unit.

The method of the invention may include the step of generating the modified serial data unit based on the serial data unit in response to the determination that at least one of the plurality of sensor measurements is invalid.

In the method of the invention, the modified serial data unit may be configured to include an error indicator that identifies the or each invalid sensor measurement.

The method of the invention may include the step of generating the modified serial data unit by replacing the or each invalid sensor measurement with a or a respective replacement sensor measurement.

The method of the invention may include the step of obtaining the or the respective replacement sensor measurement by at least one of:

performing signal processing of at least one of the plurality of sensor measurements;

estimating the or the respective replacement sensor measurement;

filtering at least one prior sensor measurement obtained at an earlier time;

predicting the or the respective replacement sensor measurement based on a prediction model and at least one prior sensor measurement obtained at an earlier time;

deriving the or the respective replacement sensor measurement from a redundant sensor measurement obtained by a corresponding redundant sensor device and/or by application level redundancy;

deriving the or the respective replacement sensor measurement from at least one valid sensor measurement.

In the method of the invention, the modified serial data unit may be configured to include an error-detecting code, the error-detecting code configured to provide a validity status of the modified serial data unit.

In the method of the invention, the modified serial data unit may be configured to include at least one error correction code, the or each error correction code associated with a or a respective invalid sensor measurement, the or each error correction code being configured to be usable to correct an error in the corresponding invalid sensor measurement and/or an error in at least one of the plurality of validity indicators.

BRIEF DESCRIPTION OF THE DRAWINGS

An embodiment of the invention will now be described, by way of a non-limiting example, with reference to the accompanying drawings in which.

DETAILED DESCRIPTION

There is provided a sensor system according to an embodiment of the invention, where the sensor system is used in a HVDC network.

The sensor system comprises a plurality of sensor devices and a gateway G. Each sensor device (e.g. current sensor, voltage sensor, etc.) is configured to measure a property of the HVDC network (e.g. current, voltage, etc.). Each sensor device is in communication with the gateway G, which in turn is configured to be in communication in use with a recipient system C, such as a HVDC network controller (e.g. a converter controller).

Figure 1:
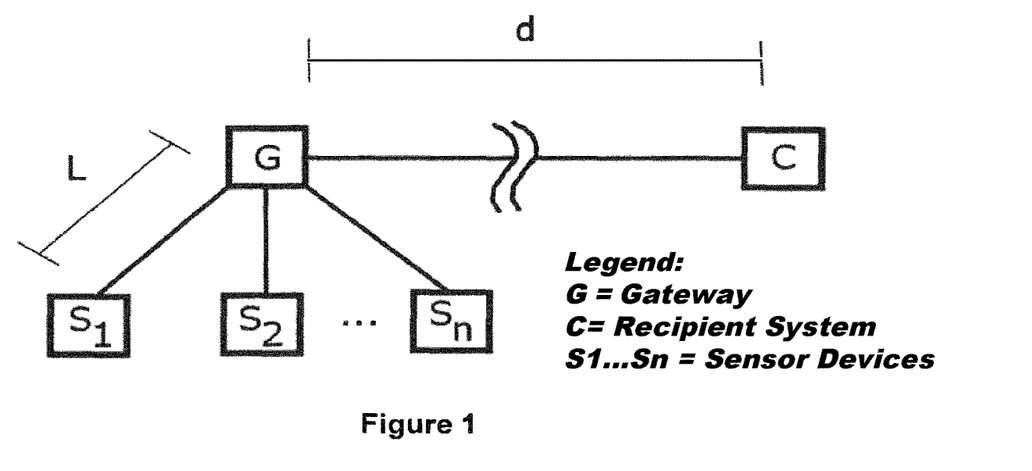
FIGS. 1 to 3 show schematically communications networks with a star topology, a bus topology, and a ring topology respectively.
Figure 2:
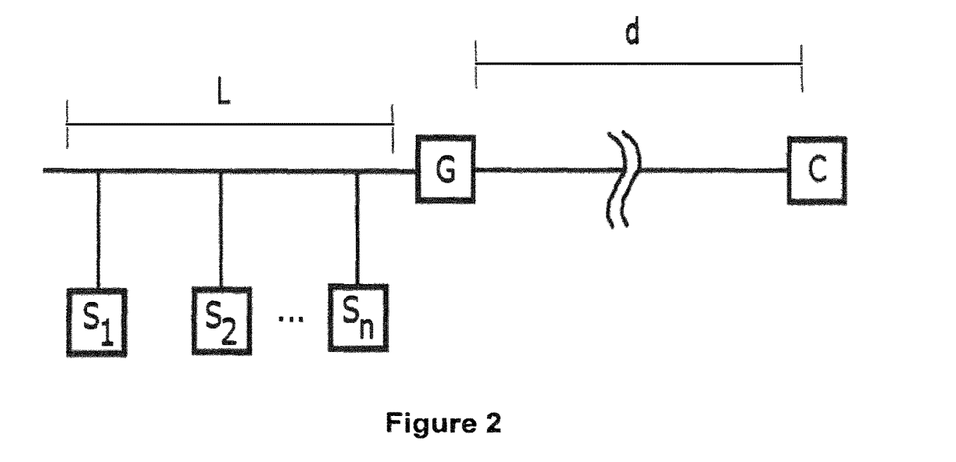
Figure 3:
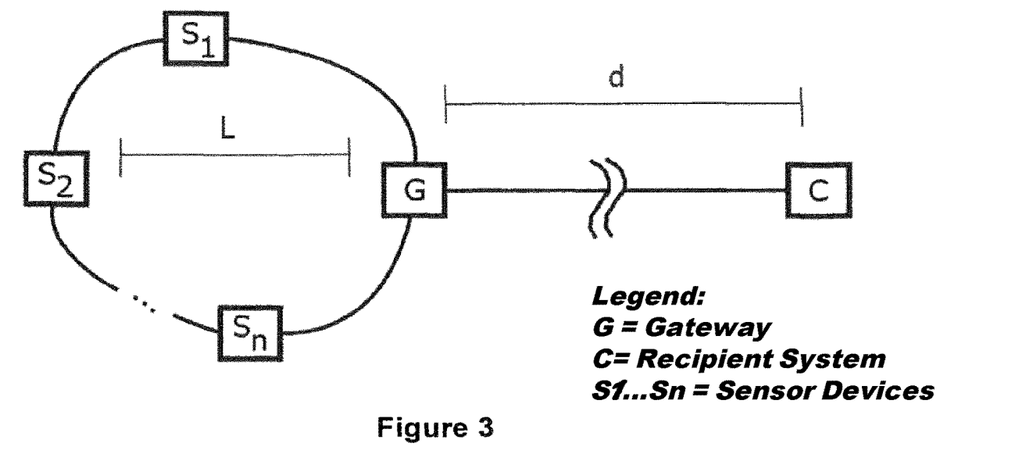

In this manner the plurality of sensor devices, the gateway G and the recipient system C define a communications network. Examples of communications networks incorporating the plurality of sensor devices, the gateway G and the recipient system C are shown in FIGS. 1 to 3 in which the communications networks have a star topology, a bus topology, and a ring topology respectively.

In other embodiments, it is envisaged that the sensor system may include one or more additional gateways. The or each additional gateway may share the same configuration as the gateway G so as to provide redundancy to the sensor system.

In use, each of the plurality of sensor devices obtains a respective sensor measurement $S_1, S_2, S_n$ corresponding to a property of the HVDC network.

Each sensor measurement $S_1, S_2, S_n$ may include a single physical measurement or may include a set of physical measurements arranged serially. For example, a given sensor device may obtain a sensor measurement $S_1, S_2, S_n$ that includes a single voltage or current, or a sensor measurement $S_1, S_2, S_n$ that includes a set of several voltages and/or currents arranged serially in a measurement data unit. Namely, each sensor measurement may correspond to one or more physical measurements.

When the distance L between the plurality of sensor devices and the gateway G is not considerably greater than the distance d between the gateway G and the recipient system C, it is desirable to arrange the plurality of sensor measurements $S_1, S_2, S_n$ in a serial data frame in order to enable the transmission of a plurality of sensor measurements $S_1, S_2, S_n$ from the plurality of sensor devices to the recipient system C at low latency to ensure stability of control of the HVDC network and its components.

Figure 4:
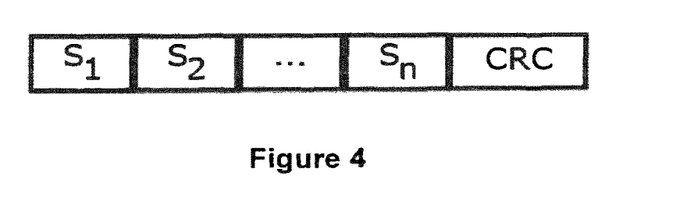
FIG. 4 shows a conventional serial data frame.

FIG. 4 shows a conventional serial data frame based on a plurality of sensor measurements $S_1, S_2, S_n$. In use, the conventional serial data frame is transmitted to the recipient system C via the gateway G.

The trailer of the conventional serial data frame includes an error-detecting code in the form of a CRC, which is calculated based on all of the sensor measurements $S_1, S_2, S_n$ in the conventional serial data frame. The error-detecting code is then evaluated, using a CRC checking algorithm, by the gateway G to determine the validity of the conventional serial data frame. This is ensure the consistency of sensor information provided by the plurality of sensor devices to the recipient system C. The CRC may be replaced by another type of validity check sequence number, such as a FCS.

The integrity of the conventional serial data frame can be adversely affected by at least one faulty bit, which results in an erroneous value when the error-detecting code is evaluated by the recipient system C. When an error is found to be present in the conventional serial data frame, the entire conventional serial data frame is discarded by the gateway G on the basis that it contains erroneous sensor information that cannot be delivered to the recipient system C. It would then be necessary to transmit a new conventional serial data frame from the plurality of sensor devices to the recipient system C.

Although the above conventional approach might be acceptable for delay-tolerant applications (such as non-real-time computations, digital TV transmission systems, internet communications, email systems, etc.), the discarding of the entire conventional serial data frame may however be unacceptable for HVDC applications. This is because discarding the entire conventional serial data frame may result in the discarding of useful sensor information, particularly in relation to time-sensitive circumstances such as a fault occurrence for which the provision of reliable waveform measurements can be important.

Figure 5:
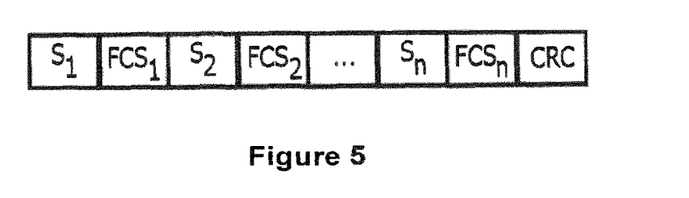
FIG. 5 shows an exemplary serial data frame generated by a sensor system according to an embodiment of the invention.

FIG. 5 shows an exemplary serial data frame generated by the plurality of sensor devices in accordance with the invention. In addition to the plurality of sensor measurements $S_1, S_2, S_n$, the serial data frame of the invention further includes a plurality of validity indicators $FCS_1, FCS_2, FCS_n$, each in the form of a FCS (which may be replaced by another type of validity check sequence number, such as a CRC). Each validity indicator $FCS_1, FCS_2, FCS_n$ is calculated based on a respective one of the plurality of sensor measurements $S_1, S_2, S_n$, and in this manner is configured to provide an individual validity status of the corresponding sensor measurement $S_1$, $S_2$, $S_n$. The serial data frame of the invention includes an error-detecting code, in the form of a CRC, to permit the identification of any errors in the validity indicators $FCS_1$, $FCS_2$, $FCS_n$.

It will be appreciated that it is optional to include a header and a trailer in the serial data frame of the invention.

After the serial data frame of the invention is transmitted from the plurality of sensor devices to the gateway G, a sensor management unit (not shown) of the gateway G evaluates each validity indicator $FCS_1$, $FCS_2$, $FCS_n$ by calculating a value based on a given sensor measurement $S_1$, $S_2$, $S_n$ stored in the serial data frame of the invention and comparing the calculated value against the corresponding validity indicator $FCS_1$, $FCS_2$, $FCS_n$. If the calculated value and the corresponding validity indicator $FCS_1$, $FCS_2$, $FCS_n$ are the same, then the given sensor measurement $S_1$, $S_2$, $S_n$ stored in the serial data frame of the invention is determined to be valid. Otherwise, if the calculated value and the corresponding validity indicator $FCS_1$, $FCS_2$, $FCS_n$ are not the same, then the given sensor measurement $S_1$, $S_2$, $S_n$ stored in the serial data frame of the invention is determined to be invalid.

In this manner the provision of the plurality of validity indicators $FCS_1$, $FCS_2$, $FCS_n$ in the serial data frame of the invention enables the sensor management unit to discern the individual data quality of each sensor measurement $S_1$, $S_2$, $S_n$ in order to determine whether each sensor measurement $S_1$, $S_2$, $S_n$ is either valid or invalid.

In contrast, the aforementioned conventional method of detecting an error in the conventional serial data frame does not take into account the individual data quality of each sensor measurement $S_1$, $S_2$, $S_n$, i.e. the aforementioned conventional method of detecting an error in the conventional serial data frame is incapable of determining which of the sensor measurements $S_1$, $S_2$, $S_n$ is invalid.

The above evaluation of the validity indicators $FCS_1$, $FCS_2$, $FCS_n$ of the serial data frame of the invention permits the gateway to implement a suitable data forwarding strategy to improve the retrieval of useful sensor information from the serial data frame.

When none of the plurality of sensor measurements $S_1$, $S_2$, $S_n$ stored in the serial data frame of the invention are determined to be invalid, the sensor management unit then transmits the serial data frame of the invention to the recipient system C.

Optionally the sensor management unit may generate a modified serial data frame by omitting the validity indicators $FCS_1$, $FCS_2$, $FCS_n$ from the serial data frame, and transmit the modified serial data frame to the recipient system C.

When at least one sensor measurement $S_1$, $S_2$, $S_n$ stored in the serial data frame of the invention is determined to be invalid, the sensor management unit then generates a modified serial data frame that includes any valid sensor measurement $S_1$, $S_2$, $S_n$ and an error indicator that identifies the or each invalid sensor measurement $S_1$, $S_2$, $S_n$, before transmitting the modified serial data frame to the recipient system C. Such configuration of the modified serial data frame enables the recipient system C to not only retrieve useful sensor information in the form of the or each valid sensor measurement $S_1$, $S_2$, $S_n$ from the modified serial data frame, but also easily and accurately identify the or each invalid sensor measurement $S_1$, $S_2$, $S_n$, thus making it more straightforward to retrieve useful sensor information from the modified serial data frame.

Optionally the modified serial data frame may be configured to omit the validity indicators $FCS_1$, $FCS_2$, $FCS_n$ from the serial data frame, so that the size of the modified serial data frame can be reduced to improve the efficiency of transmitting the modified serial data frame to the recipient system C.

To increase the amount of useful sensor information that can be retrieved from the modified serial data frame, the sensor management unit may generate the modified serial data frame by replacing the or each invalid sensor measurement $S_1$, $S_2$, $S_n$ with a or a respective replacement sensor measurement.

The or the respective replacement sensor measurement may be obtained by the sensor management unit through signal processing of at least one of the plurality of sensor measurements $S_1$, $S_2$, $S_n$. It will be understood that the signal processing strategy may be at least partly under the control of the recipient system C.

In an example of signal processing of at least one of the plurality of sensor measurements $S_1$, $S_2$, $S_n$, the sensor management unit may obtain the or the respective replacement sensor measurement using application level redundancy. For example, the sensor management unit may perform an estimated calculation (e.g. extrapolation, interpolation, etc.) of the or the respective replacement sensor measurement based on one or more valid sensor measurements $S_1$, $S_2$, $S_n$.

In another example of signal processing of at least one of the plurality of sensor measurements, the sensor management unit may obtain the or the respective replacement sensor measurement by filtering at least one prior sensor measurement obtained at an earlier time and stored in the gateway.

For example, a given sensor measurement, e.g. $S_1(k)$, may be missing from the serial data frame due to an error in the frame, where 'k' refers to the time instant. Then, if the or each prior sensor measurement $S_1(m)$ for earlier instants of time is stored in the gateway, the sensor management unit can obtain a filtered sensor measurement $S_1(k)$ by filtering the or each prior sensor measurement $S_1(m)$. An exemplary filtered signal $S_1(k)$ could be given by $S_1(k)=(1/m)*[S_1(k-1)+ \ldots +S_1(k-m)]$.

In a further example of signal processing of at least one of the plurality of sensor measurements, the sensor management unit may obtain the or the respective replacement sensor measurement by predicting the or the respective replacement sensor measurement based on a prediction model and at least one prior sensor measurement obtained at an earlier time and stored in the gateway.

For example, a given sensor measurement, e.g. $S_1(k)$, may be missing from the serial data frame due to an error in the frame, where 'k' refers to the time instant. Then, if the or each prior sensor measurement $S_1(m)$ for earlier instants of time is stored in the gateway, the sensor management unit can obtain a predicted sensor measurement $S_1(k)$ based on a prediction model and the or each prior sensor measurement $S_1(m)$. An exemplary prediction signal $S_1(k)$ could be given by $S_1(k)=\text{PredictionModel}(S_1(k-1), \ldots, S_1(k-m))$. The prediction model may be or may include a set of mathematical equations that describe the expected evolution of signal $S_1$ as a function of time and is based on the or each prior sensor measurement $S_1(m)$.

Furthermore the sensor system may include a plurality of redundant sensor devices (not shown), each of which is configured to measure the same property of the HVDC network as a respective one of the plurality of sensor devices. This allows the sensor management unit to obtain the or the respective replacement sensor measurement using sensor redundancy by deriving the or the respective replacement sensor measurement from a redundant sensor measurement obtained by a corresponding redundant sensor device. This allows the direct replacement of an invalid sensor measurement $S_1$, $S_2$, $S_n$ with an actual sensor measurement obtained from a redundant sensor device.

Additionally or alternatively, the sensor management unit may obtain the or the respective replacement sensor measurement by deriving the or the respective replacement sensor measurement from a redundant sensor measurement obtained by application level redundancy. In one example, if a given sensor measurement $S_1$ is linked to one or more other sensor measurements $S_2$, $S_n$ at application level via an equation (e.g. $S_1=S_2+S_n$), a redundant version of the given sensor measurement $S_1$ can be obtained by the application level redundancy via the equation (e.g. $S_1$(redundant)$=S_2+S_n$). In another example, if the sensor measurements $S_1$, $S_2$, $S_n$ are voltage measurements in a circuit loop, the sensor measurements $S_1$, $S_2$, $S_n$ would be linked via Kirchhoff's voltage law, which can then be used to obtain a redundant version of any one of the sensor measurements $S_1$, $S_2$, $S_n$.

Optionally the sensor management unit may calculate an error-detecting code of the modified serial data frame prior to transmitting the modified serial data to the recipient system C. The error-detecting code may be in the form of a validity check sequence number, such as a cyclic redundancy check (CRC) or a frame checksum sequence (FCS). The provision of the error-detecting code in the modified serial data allows the recipient system C to evaluate the validity of the modified serial data.

Further optionally the modified serial data frame may be configured to include at least one error correction code, where the or each error correction code is associated with a or a respective invalid sensor measurement $S_1$, $S_2$, $S_n$ and/or an error in at least one of the plurality of validity indicators $FCS_1$, $FCS_2$, $FCS_n$. The or each error correction code can be used by the recipient system C to correct an error in the corresponding invalid sensor measurement $S_1$, $S_2$, $S_n$ and/or an error in at least one of the plurality of validity indicators $FCS_1$, $FCS_2$, $FCS_n$.

The or each error correction code is included in the serial data frame in the form of one or more redundant bits, which do not add further sensor information but instead provide a safeguard to recover lost data if needed.

For example, when a given sensor measurement $S_1$ is formed of the following serially-arranged binary data bits: [d1 d2=1 0], redundancy bits may be added at each sensor device by using the following expression: r1=d1, r2=XOR(d1, d2), r3=XOR(r1,r2), where XOR(.) is the exclusive-or logical operator. The following serially-arranged bits [d1 d2 r1 r2 r3] are then transmitted from each sensor device to the gateway. The sensor management unit checks the validity of the received data by comparing d1 and r1 (which should match in an error-free case) and by computing the received value of d1 with the received value of d2.

In this example, and without loss of generality, it is assumed that only one bit can fail at a time. When the following serially-arranged binary data bits are generated as [d1 d2=1 0], then the serially-arranged bits transmitted to the gateway would be: [d1 d2 r1 r2 r3]=[1 0 1 1 0]. If, for example, bit d2 is erroneous, the received serial data frame takes the form of [d1 d2 r1 r2 r3]=[1 1 1 1 0]. The sensor management unit can then compute the following validations: d1=r1 (and hence it can assume that d1 is correct); XOR(d1,d2)=0, which is different from the received value of r2; XOR(r1,r2)=0, which is equal to the received value of r3, and from this it can assume no errors have occurred in the redundancy bits. Hence the sensor management unit can infer that d2 is erroneous, and correct the value of d2 by reversing its logical value, hence locally producing the data bits [d1 d2]=[1 0] to match the originally generated data bits. The corrected serial data frame is then transmitted to the recipient system C without the need for retransmitting data from the sensor devices to the gateway.

Figure 6:
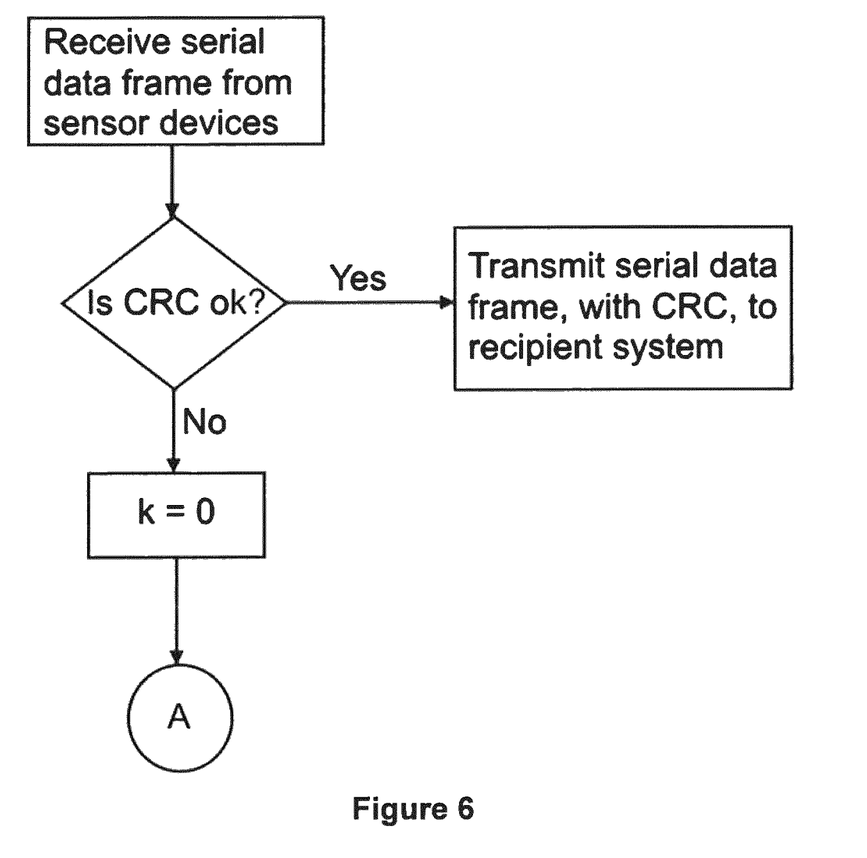
FIG. 6 illustrates a flow chart depicting an exemplary data forwarding algorithm implemented by the sensor system of the invention.

FIG. 6 illustrates a flow chart depicting an exemplary data forwarding algorithm implemented at the gateway G of the sensor system of the invention.

Upon reception of a serial data frame at the gateway G, the sensor management unit evaluates the error-detecting code of the serial data frame to determine whether there is any error present in the serial data frame.

If the evaluation of the error-detecting code determines that there are no errors in the serial data frame, the serial data frame is then forwarded in its entirety to the recipient system C. The validity indicators $FCS_1$, $FCS_2$, $FCS_n$ may optionally be omitted from the forwarded serial data frame.

If the evaluation of the error-detecting code determines that there is at least one error in the serial data frame, the sensor management unit then individually evaluates each validity indicator $FCS_1$, $FCS_2$, $FCS_n$ in order to determine whether the corresponding sensor measurement $S_1$, $S_2$, $S_n$ is valid or invalid.

Any valid sensor measurement $S_k$ is stored in a buffer, which is denoted as F[k] in FIG. 6, where k=1, 2, ..., n. Meanwhile the or each invalid sensor measurement is flagged as erroneous, and in the embodiments shown is replaced by a replacement sensor measurement $\hat{S}_k$, which is then stored in the buffer F[k], where k=1, 2, ..., n. Ways of obtaining a replacement sensor measurement are detailed elsewhere in this patent specification.

Alternatively (not shown in FIG. 6), instead of replacing the or each invalid sensor measurement $S_1$, $S_2$, $S_n$, the or each invalid sensor measurement $S_1$, $S_2$, $S_n$ may be stored in the buffer F[k], and the modified serial data frame is configured to include an error indicator that identifies the or each invalid sensor measurement $S_1$, $S_2$, $S_n$.

After all of the validity indicators $FCS_1$, $FCS_2$, $FCS_n$ have been evaluated, the sensor management unit calculates an error-detecting code of the modified serial data frame, and then transmits the modified serial data frame F to the recipient system C.

The sensor system of the invention therefore permits the retrieval of useful sensor information from a serial data frame that includes at least one error, which in turn may limit or eliminate the need to transmit a new serial data frame. This has the effect of improving the reliability and performance of the sensor system. In addition the invention is not only scalable to any number of sensor devices in the sensor system, but also allows the frame error rate (i.e. the number of frame errors per unit time) to be controlled independently of the number of sensor devices.

It will be appreciated that the serial data frame in the above-described embodiment of the invention may be replaced by another type of serial data unit, such as a serial data.

What we claim is:

1. A sensor system for use in a high voltage direct current network, the sensor system comprising
  a plurality of sensor devices, each sensor device configured to obtain a respective sensor measurement, wherein the plurality of sensor devices are configured to generate a serial data unit for transmission to a recipient system, the serial data unit comprising a serial sequence of bits configured to include a plurality of sensor measurements, the serial sequence of bits further configured to include a plurality of validity indicators, each validity indicator being in between two respective sensor measurements of the plurality of sensor measurements in the serial sequence of bits and configured to provide an individual validity status of a respective one of the two respective sensor measurements;

a sensor management unit configured to evaluate said each validity indicator from the serial data unit to detect that the serial sequence of bits comprises a first validity indicator labeling a valid sensor measurement for a first sensor measurement adjacent to the first validity indicator in the serial sequence of bits and a second validity indicator labeling an invalid sensor measurement for a second sensor measurement adjacent to the second validity indicator in the serial sequence of bits the sensor management unit further configured to generate a modified serial data unit based on the serial data unit subsequent to the sensor management unit evaluating said each validity indicator, and to determine, based on the second validity indicator, that the second sensor measurement is invalid, wherein the modified serial data unit is configured to include the valid sensor measurement from the serial data unit and an error indicator that identifies the second sensor measurement from the serial data unit as invalid and to include the error indicator that identifies the second sensor measurement from the serial data unit as invalid; and the sensor management unit further configured to transmit the modified serial data unit to the recipient system; and wherein the sensor management unit is further configured to transmit the serial data unit to the recipient system in response to the sensor management unit determining that none of the plurality of sensor measurements are invalid.

2. The sensor system according to claim 1, wherein each sensor measurement of the plurality of sensor measurements includes a single physical measurement or includes a set of physical measurements arranged serially.

3. The sensor system according to claim 1, further including at least one gateway of a plurality of gateways configured to be in communication with the plurality of sensor devices, wherein each gateway includes the sensor management unit, and said each gateway is configured to be communicable with the recipient system.

4. The sensor system according to claim 1, wherein the modified serial data unit is configured to include the valid sensor measurement from the serial data unit.

5. The sensor system according to claim 1, wherein the modified serial data unit is configured to omit the validity indicators from the serial data unit.

6. The sensor system according to claim 1, wherein the sensor management unit is configured to generate the modified serial data unit based on the serial data unit in response to the sensor management unit determining that at least one of the plurality of sensor measurements is invalid.

7. The sensor system according to claim 6, wherein the sensor management unit is configured to generate the modified serial data unit by replacing each invalid sensor measurement of a plurality of invalid sensor measurements with a respective replacement sensor measurement.

8. The sensor system according to claim 7, wherein the sensor management unit is configured to obtain the respective replacement sensor measurement by at least one of:

performing signal processing of at least one of the plurality of sensor measurements;

estimating the respective replacement sensor measurement;

filtering at least one prior sensor measurement obtained at an earlier time;

predicting the respective replacement sensor measurement based on a prediction model and said at least one prior sensor measurement obtained at the earlier time;

deriving the respective replacement sensor measurement from a redundant sensor measurement obtained by a corresponding redundant sensor device and/or by application level redundancy; and deriving the respective replacement sensor measurement from the valid sensor measurement.

9. The sensor system according to claim 1, wherein the modified serial data unit is configured to include an error-detecting code, the error-detecting code configured to provide a validity status of the modified serial data unit.

10. The sensor system according to claim 1, wherein the modified serial data unit is configured to include at least one error correction code of a plurality of error correction codes, each error correction code of the plurality of error correction codes associated with a respective invalid sensor measurement, said each error correction code being configured to be usable to correct a first error in the respective invalid sensor measurement and/or a second error in at least one of the plurality of validity indicators.

11. A method of operating a sensor system, wherein the sensor system is for use in a high voltage direct current network, the sensor system comprising a plurality of sensor devices, each sensor device configured to obtain a respective sensor measurement, the method further including:

generating a serial data unit for transmission to a recipient system, the serial data unit comprising a serial sequence of bits configured to include a plurality of sensor measurements of the sensor devices, the serial sequence of bits further configured to include a plurality of validity indicators, each validity indicator being in between two respective sensor measurements of the plurality of sensor measurements in the serial sequence of bits and configured to provide an individual validity status of a respective one of the two respective sensor measurements;

evaluating said each validity indicator from the serial data unit to detect that the serial sequence of bits comprises a first validity indicator labeling a valid sensor measurement for a first sensor measurement adjacent to the first validity indicator in the serial sequence of bits and a second validity indicator labeling an invalid sensor measurement for a second sensor measurement adjacent to the second validity indicator in the serial sequence of bits;

generating a modified serial data unit based on the serial data unit subsequent to a sensor management unit evaluating said each validity indicator, to determine, based on the second validity indicator, that the second sensor measurement from the serial data unit is invalid, wherein the modified serial data unit is configured to include the valid sensor measurement from the serial data unit and an error indicator that identifies the second sensor measurement from the serial data unit as invalid;

transmitting the modified serial data unit to the recipient system; and transmitting the serial data unit to the recipient system in response to the sensor management unit determining that none of the plurality of sensor measurements are invalid.

12. The method of claim 11, wherein each sensor measurement of the plurality of sensor measurements includes a single physical measurement or includes a set of physical measurements arranged serially.

13. The method of claim 11, wherein a gateway includes the sensor management unit, and each gateway of a plurality of gateways is configured to be communicable with the recipient system.

14. The method of claim 11, wherein the modified serial data unit includes the valid sensor measurement from the serial data unit.

15. The method of claim 11, wherein the modified serial data unit omits the plurality of validity indicators from the serial data unit.

16. The method of claim 11, wherein the modified serial data unit is based on the serial data unit in response to the sensor management unit determining that at least one of the plurality of sensor measurements is invalid.

17. The method of claim 11, wherein the modified serial data unit replaces each invalid sensor measurement of a plurality of invalid sensor measurements with a respective replacement sensor measurement.

18. The method of claim 17, wherein the respective replacement sensor measurement is obtained by at least one of:
performing signal processing of at least one of the plurality of sensor measurements;
estimating the respective replacement sensor measurement;
filtering at least one prior sensor measurement obtained at an earlier time;
predicting the respective replacement sensor measurement based on a prediction model and said at least one prior sensor measurement obtained at the earlier time;
deriving the respective replacement sensor measurement from a redundant sensor measurement obtained by a corresponding redundant sensor device and/or by application level redundancy; and
deriving the respective replacement sensor measurement from the valid sensor measurement.

19. The method of claim 11, wherein the modified serial data unit includes an error-detecting code, the error-detecting code configured to provide a validity status of the modified serial data unit.

20. The method of claim 11, wherein the modified serial data unit includes at least one error correction code of a plurality of error correction codes, each error correction code of the plurality of error correction codes associated with a respective invalid sensor measurement, said each error correction code being configured to be usable to correct a first error in the respective invalid sensor measurement and/or a second error in at least one of the plurality of validity indicators.

* * * * *